(12) United States Patent
Lee et al.

(10) Patent No.: US 8,713,573 B2
(45) Date of Patent: Apr. 29, 2014

(54) SYNCHRONIZATION SCHEDULING APPARATUS AND METHOD IN REAL-TIME MULTI-CORE SYSTEM

(75) Inventors: Jae Don Lee, Gyeonggi-do (KR); Shi Hwa Lee, Seoul (KR); Seung Won Lee, Gyeonggi-do (KR); Chae Seok Im, Gyeonggi-do (KR); Min Kyu Jeong, Gyeonggi-do (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 79 days.

(21) Appl. No.: 13/297,829

(22) Filed: Nov. 16, 2011

(65) Prior Publication Data

US 2012/0159501 A1  Jun. 21, 2012

(30) Foreign Application Priority Data

Dec. 21, 2010 (KR) .................. 10-2010-0131809

(51) Int. Cl.
*G06F 9/46* (2006.01)
(52) U.S. Cl.
USPC ........................................... 718/103

(58) Field of Classification Search
None
See application file for complete search history.

(56) References Cited

U.S. PATENT DOCUMENTS

| 5,895,493 | A | 4/1999 | Gatica | |
|---|---|---|---|---|
| 7,539,902 | B2 | 5/2009 | Aluru | |
| 8,156,275 | B2 * | 4/2012 | de Cesare et al. | 710/200 |
| 8,276,142 | B2 * | 9/2012 | Alameldeen et al. | 718/100 |
| 2009/0031317 | A1 * | 1/2009 | Gopalan et al. | 718/103 |

FOREIGN PATENT DOCUMENTS

| KR | 10-2002-0087928 | 11/2002 |
|---|---|---|
| KR | 10-2007-0101264 | 10/2007 |

* cited by examiner

*Primary Examiner* — Gregory A Kessler
(74) *Attorney, Agent, or Firm* — Staas & Halsey LLP

(57) ABSTRACT

A synchronization scheduling apparatus and method in a real-time multi-core system are described. The synchronization scheduling apparatus may include a plurality of cores, each having at least one wait queue, a storage unit to store information regarding a first core receiving a wake-up signal in a previous cycle among the plurality of cores, and a scheduling processor to schedule tasks stored in the at least one wait queue, based on the information regarding the first core.

17 Claims, 5 Drawing Sheets

_(US 8,713,573 B2)_

SYNCHRONIZATION SCHEDULING APPARATUS AND METHOD IN REAL-TIME MULTI-CORE SYSTEM

CROSS-REFERENCE TO RELATED APPLICATIONS

This application claims the benefit of Korean Patent Application No. 10-2010-0131809, filed on Dec. 21, 2010, in the Korean Intellectual Property Office, the disclosure of which is incorporated herein by reference.

BACKGROUND

1. Field

Example embodiments of the following description relate to a scheduling apparatus and method for synchronization between cores in a real-time multi-core system including a large number of cores having a scratchpad memory (SPM).

2. Description of the Related Art

One of the most noticeable trends in the design of microprocessors may be the utilization of multi-core processors. Since the advent of dual-core products, a movement toward the use of multi-core processors has become more prevalent, with the development of many-core processors, which utilize a large number of core processors, arising.

Historically, multi-core architecture came about as chip density of processors has increased. For example, historically the number of on-chip processing resources has increased based on Moore's law.

Conventional multi-core chips can include about 10 cores, however it is expected that hundreds of cores can be included in a single chip in the near future.

Recently, there has been an increased awareness of problems associated with approaching physical limits of processor frequencies. Concerns due to heat generation and power consumption during the use of a computer are also increasing. As a result, the structure of a multi-core processor is emerging as a powerful alternative, and as a possible new standard.

As the use of multi-core architecture is becoming more common, parallel processing is being increasingly performed in personal computers (PCs), as well as in super computers, including clusters, and even in embedded systems.

In a parallel program, synchronization occurs frequently, to coordinate sub-jobs and to terminate a job. Synchronization refers to timing to perform jobs, that is, adjusting time intervals so that cases may occur at the same time, or occur in regular intervals. To achieve an optimal performance, synchronization needs to enable parallel processing to be efficiently performed using costs added for the parallel processing.

In a computer with a structure of a shared memory that shares a memory between cores, a cache coherency system is required to maintain a coherency of data in a cache of each of the cores. However, as the number of processors increase, it is more difficult to form a cache coherency system.

Furthermore, scalability of a computer having a structure with a shared memory is reduced, compared the scalability of a computer having a structure with a distributed memory. Additionally, when a cache is used in a real-time system, it is more difficult to ensure real-time performance.

Accordingly, a multi-core system using a scratchpad memory (SCM), instead of a cache, is recently being utilized more frequently. However, since considerable costs are incurred in the movement of tasks between cores in a system with a local memory, such as an SCM, it is important to minimize the movement of tasks, and to balance loads between cores through efficiently scheduling.

SUMMARY

The foregoing and/or other aspects are achieved by providing a synchronization scheduling apparatus in a real-time multi-core system, including a plurality of cores, each having at least one wait queue, a storage unit to store information regarding a first core among the plurality of cores, the first core receiving a wake-up signal in a previous cycle, and a scheduling processor to schedule tasks based on the information regarding the first core, the tasks being stored in the at least one wait queue.

The foregoing and/or other aspects are achieved by providing a synchronization scheduling method in a real-time multi-core system, including maintaining a plurality of cores, each having at least one wait queue, storing information regarding a first core among the plurality of cores, the first core receiving a wake-up signal in a previous cycle, and scheduling tasks based on the information regarding the first core, the tasks being stored in the at least one wait queue, wherein the scheduling includes scheduling the tasks based on priorities of the tasks.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
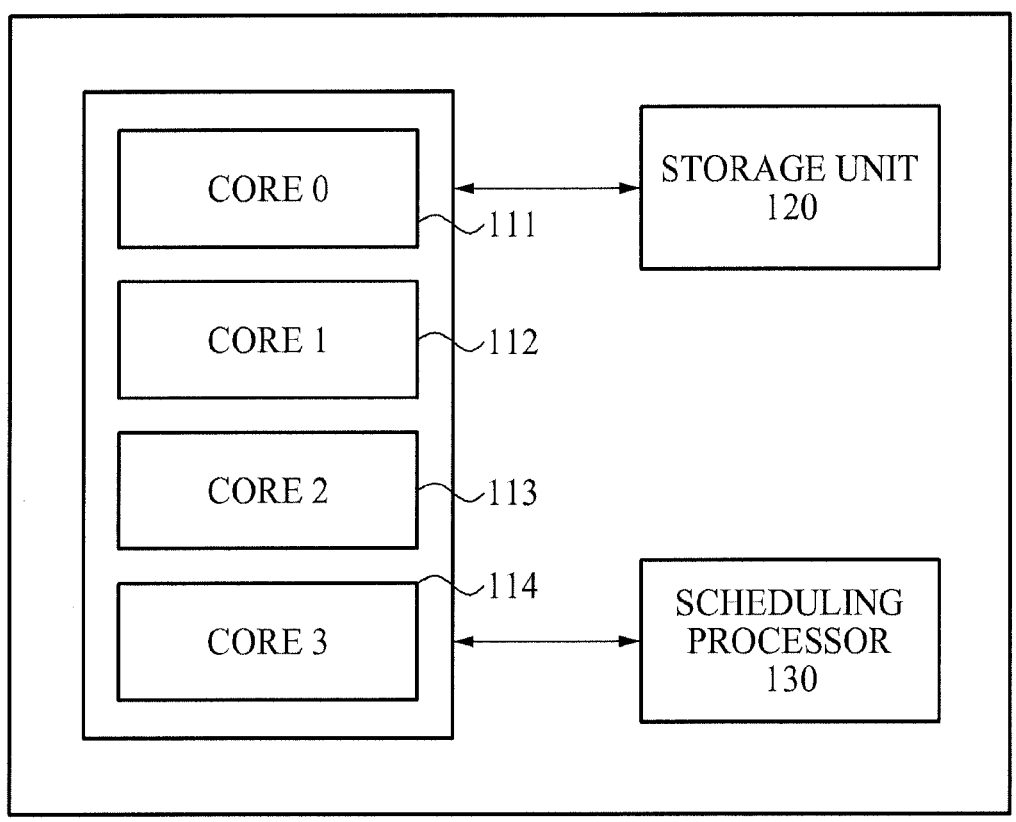
FIG. 1 illustrates a block diagram of a synchronization scheduling apparatus according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 illustrates a block diagram of a synchronization scheduling apparatus 100 according to example embodiments.

The synchronization scheduling apparatus 100 of FIG. 1 may include a storage unit 120, a scheduling processor 130, a plurality of cores, for example core 0 111, core 1 112, core 2 113, and core 3 114.

Each of the plurality of cores 0-3 111-114, may have at least one wait queue.

The plurality of cores 0-3 111-114, may be used to implement a parallel program, and may be individually synchronized and operated to process sub-jobs. In other words, the plurality of cores 0-3 111-114, may perform parallel processing by adjusting a timing to perform jobs through synchronization.

The storage unit 120 may store information regarding a first core which may receive a wake-up signal in a previous cycle, among the plurality of cores 0-3 111-114.

Here, the wake-up signal may be interpreted as a signal to change, to an activation state, a state of a core that may process a task scheduled based on a selected criterion, for example a priority, (e.g., a task priority), in a predetermined cycle.

When the first core having a predetermined task receives the wake-up signal in the previous cycle, and processes the predetermined task, the storage unit 120 may store the information regarding the first core.

The information regarding the first core may include all types of information used to identify the first core.

The scheduling processor 130 may schedule tasks stored in the at least one wait queue, based on the information regarding the first core.

For example, the scheduling processor 130 may verify, lastly, the first core that is already woken up in the previous cycle.

More specifically, the scheduling processor 130 may verify the priorities of the stored tasks in an order from a wait queue of a second core through a wait queue of the first core, and may schedule the tasks so that a core to which a wake-up signal is to be assigned may be determined.

For example, when the core 0 111 processes a task in response to a wake-up signal in a previous cycle, information regarding the core 0 111 may be stored in the storage unit 120.

In this example, the scheduling processor 130 may verify the information regarding the core 0 111 in the storage unit 120, and may verify a wait queue of each of the cores 0 111 through the core 3 114, in an order of the core 1 112, the core 2 113, the core 3 114, and the core 0 111. During the verifying of the wait queue, when a task needing to be scheduled is determined, a wake-up signal may be provided to a core corresponding to the determined task.

A core that is already scheduled may be verified last and thus, it is possible to perform efficient parallel processing in a system with a local memory, by properly adjusting a time for performing sub-jobs of the cores 0-3 111-114. Additionally, it is possible to prevent costs from being incurred by movement of tasks.

The scheduling processor 130 may schedule the tasks stored in the at least one wait queue, based on priorities of the tasks. Additionally, the scheduling processor 130 may apply various scheduling schemes, for example a preemptive scheduling scheme, or a non-preemptive scheduling scheme, based on a timing to perform jobs, in addition to the priorities.

For example, the scheduling processor 130 may schedule the tasks stored in the at least one wait queue, using a Round Robin (RR) scheduling scheme, a Shortest Remaining Time (SRT) scheduling scheme, a Multilevel Feedback Queue (MFQ) scheduling scheme, a First-In First-Out (FIFO) scheduling scheme, a Shortest Job First (SJF) scheduling scheme, a deadline scheduling scheme, a Highest Response Ratio Next (HRRN) scheduling scheme, and the like.

Thus, when the synchronization scheduling apparatus 100 is used, it is possible to efficiently perform synchronization to maintain a high level of performance of a parallel application program in a system including a plurality of cores having a scratchpad memory (SPM).

Figure 2:
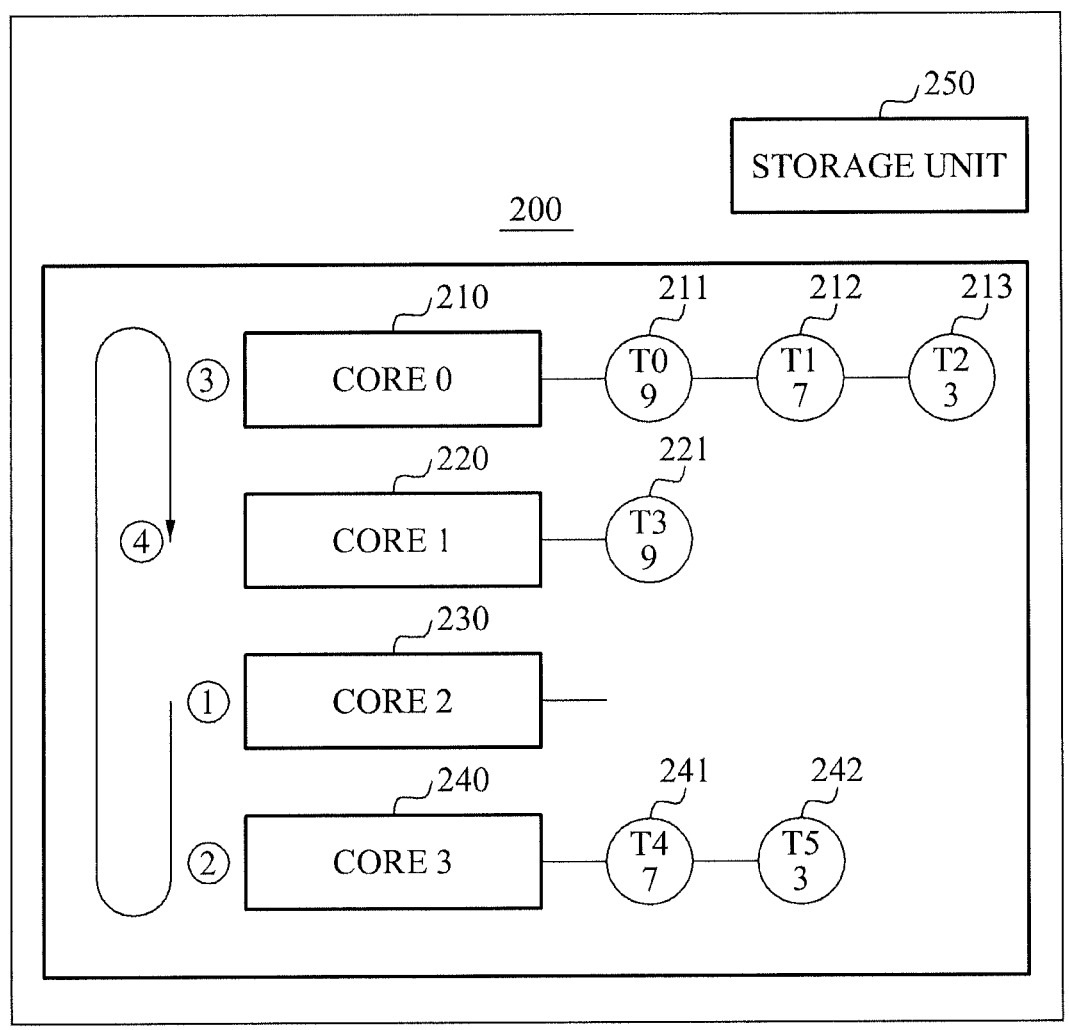
FIG. 2 illustrates a diagram of an operation of processing tasks between cores according to example embodiments.

FIG. 2 illustrates a diagram which includes examples of wait queues applicable to a synchronization scheduling apparatus to describe an operation of processing tasks between cores, according to example embodiments.

In a multi-core system, each core may have a wait queue.

Referring to FIG. 2, a core 0 210 may have a wait queue including tasks T0 211, T1 212, and T2 213, and a core 1 220 may have a wait queue including a task T3 221. Additionally, a core 2 230 may not have a wait queue, and a core 3 240 may have a wait queue including tasks T4 241, and T5 242.

Each of the wait tasks T0 to T5 may have a priority. For example, each of the tasks T0 211 and T3 221 may have a priority of "9", and each of the tasks T1 212 and T4 241 may have a priority of "7". Additionally, each of the tasks T2 213 and T5 242 may have a priority of Here, when a process to be woken up is selected based on only the priorities, a problem of performance may occur. For example, in a multi-core system, processes having the same priority may be distributed to multiple cores and may stall. In this example, when the processes are appropriately distributed to each of the multiple cores, but a wake-up signal is not provided, starvation may occur, thereby making it impossible for a corresponding core to perform a job.

To solve such a problem, the synchronization scheduling apparatus according to example embodiments may start to search for a wait queue of the core 2 230 next to the core 1 220 that is already woken up in a previous cycle, and may then search for wait queues of the core 0 210, core 3 240, and core 1 220.

In other words, the synchronization scheduling apparatus may search for the wait queue of the core 1 220 last, since it was already woken up in the previous cycle, and may find a process to be woken up.

Referring to FIG. 2, when a task stored in a wait queue of a core 0 210 has the same priority, for example a priority of "9", as a task stored in a wait queue of a core 1 220, and when the same priority is verified to be the highest among the priorities, the synchronization scheduling apparatus according to example embodiments may provide the core 0 210 with a wake-up signal.

In other words, the scheduling processor 130 of FIG. 1 may verify the at least one wait queue in the order from the wait queue of the second core through the wait queue of the first core, and may schedule a task first found among tasks having the same priority.

Figure 3:
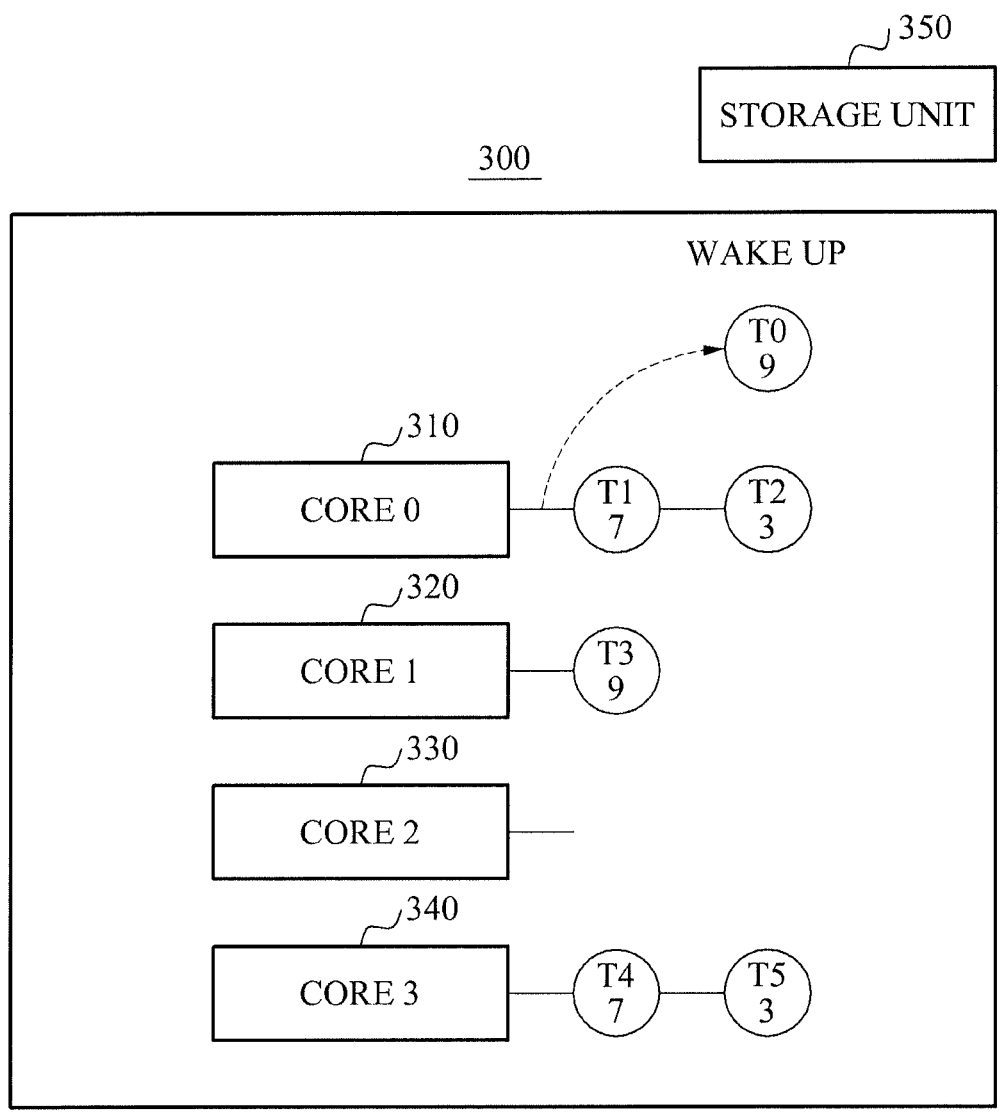
FIG. 3 illustrates a diagram of an operation of processing tasks between cores based on a core that receives a wake-up signal in a previous cycle according to example embodiments.

Referring to FIG. 3, since a wake-up signal is already provided to a core 1 320, wait queues may be verified in an order of a core 2 330, a core 3 340, a core 0 310, and the core 1 320. Here, since a process T0 in a wait queue of the core 0 310 has a highest priority of "9", the task T0 may be woken up in response to a synchronization signal.

Additionally, the wait queue of the core 0 310 may be changed. For example, the wait queue may include a task to be processed, instead of the processed task. Furthermore, information regarding the core 0 310 receiving the wake-up signal may be updated to a storage unit 350, as shown in FIG. 3.

Hereinafter, the changing of the wait queue of the core 0 310, and the updating of the storage unit 350 will be further described with reference to FIG. 3.

FIG. 3 illustrates a diagram of an operation of processing tasks between cores based on a core that receives a wake-up signal in a previous cycle.

Similar to FIG. 2, a synchronization scheduling apparatus according to example embodiments may perform parallel processing using cores 0-3 310-340. The synchronization scheduling apparatus may arbitrate a wake-up operation of cores 0-3 310-340, and may control synchronization processing to be performed.

Accordingly, the synchronization scheduling apparatus may verify priorities of tasks assigned to each of the cores 0-3 310-340, in the order of the core 2 330, the core 3 340, and the core 0 310, next to the core 1 320 that is already woke up.

As a result of the verifying, since a task T0 assigned to the core 0 310 has a highest priority of "9", the synchronization scheduling apparatus may perform scheduling so that the task T0 may be processed. For example, the synchronization scheduling apparatus may provide a wake-up signal to the core 0 310 having the task T0, and may process the task T0.

Subsequently, the synchronization scheduling apparatus may store, in the storage unit 350, information regarding the core 0 310 that currently receives the wake-up signal.

The storage unit 350 may update the information regarding the core 0 310, instead of information regarding the core 1 that is already woken up.

Figure 4:
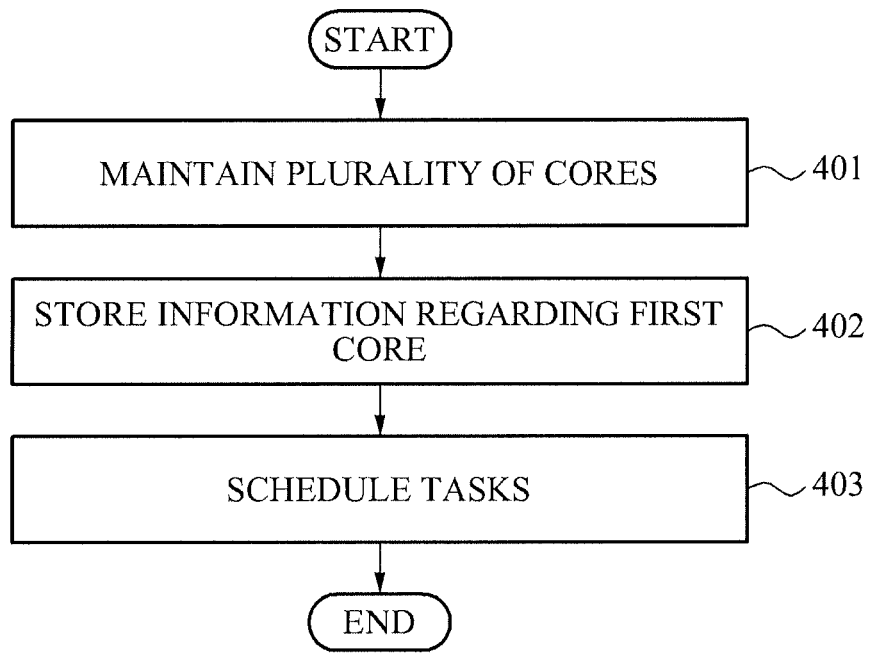
FIG. 4 illustrates a flowchart of a synchronization scheduling method according to example embodiments.

FIG. 4 illustrates a flowchart of a synchronization scheduling method according to example embodiments.

In operation 401, a plurality of cores may be maintained. Here, each of the plurality of cores may have at least one wait queue.

Parallel processing may be performed through the plurality of cores.

In operation 402, information regarding a first core that receives a wake-up signal in a previous cycle among the plurality of cores may be stored.

In operation 403, tasks stored in the at least one wait queue may be scheduled based on the information regarding the first core.

Here, the tasks may be scheduled based on priorities of the tasks.

For example, the priorities of the tasks may be verified in an order from a wait queue of a second core through a wait queue of the first core. Additionally, when a task stored in the wait queue of the first core has a same priority as a task stored in a wait queue of another core, and when the same priority is verified to be the highest among the priorities, the task stored in the wait queue of the other core may be scheduled (e.g., the task first found among the tasks having the same priority).

Figure 5:
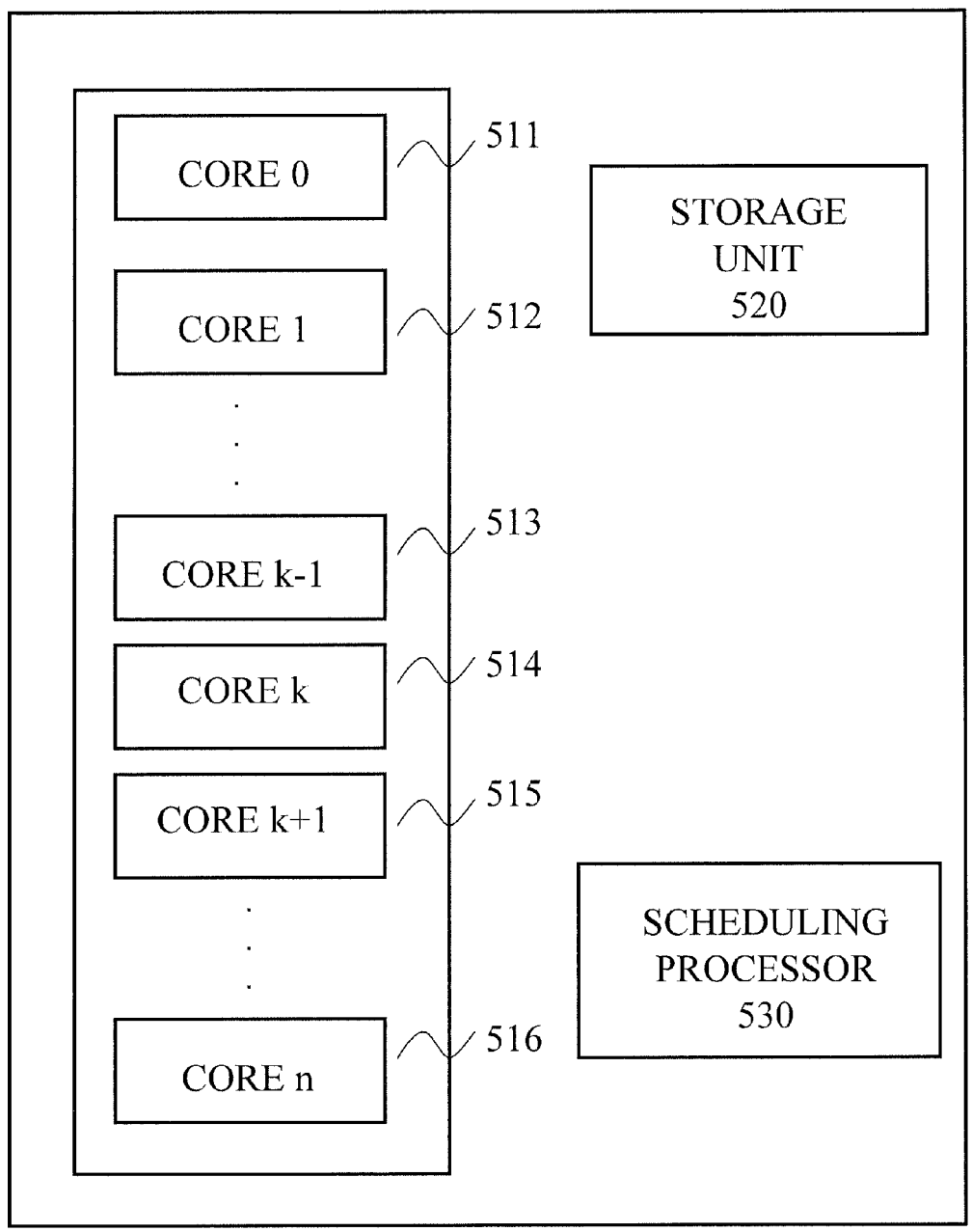
FIG. 5 illustrates a block diagram of a synchronization scheduling apparatus according to example embodiments.

FIG. 5 illustrates a block diagram of a synchronization scheduling apparatus 500 according to example embodiments, similar to FIG. 1, but on a more general scale.

The synchronization scheduling apparatus 500 of FIG. 5 may include a storage unit 520, a scheduling processor 530, a plurality of cores, for example core 0 511, core 1 512, core k−1 513, core k 514, core k+1 515, through core n 516.

Each of the plurality of cores 0-n 511-516, may have at least one wait queue.

The plurality of cores 0-n 511-516, may be used to implement a parallel program, and may be individually synchronized and operated to process sub-jobs. In other words, the plurality of cores 0-n 511-516, may perform parallel processing by adjusting a timing to perform jobs through synchronization.

The storage unit 520 may store information regarding a first core which may receive a wake-up signal in a previous cycle, among the plurality of cores 0-n 511-516.

The scheduling processor 530 may schedule tasks stored in the at least one wait queue, based on the information regarding the first core.

For example, the scheduling processor 530 may verify, lastly, the core that is already woken up in the previous cycle.

For example, when core 0 511 processes a task in response to a wake-up signal in a previous cycle, information regarding core 0 511 may be stored in the storage unit 520.

In this example, the scheduling processor 530 may verify the information regarding core 0 511 in the storage unit 520, and may verify a wait queue of each of the cores 0-n 511-516, in an order of the core 1 512 through core n 516, and then lastly core 0 511. During the verifying of the wait queue, when a task needing to be scheduled is determined, a wake-up signal may be provided to a core corresponding to the determined task.

A core that is already scheduled may be verified last and thus, it is possible to perform efficient parallel processing in a system with a local memory, by properly adjusting a time for performing sub-jobs of the cores 0-n 511-516. Additionally, it is possible to prevent costs from being incurred by movement of tasks.

The scheduling processor 530 may schedule the tasks stored in the at least one wait queue, based on priorities of the tasks. Additionally, the scheduling processor 530 may apply various scheduling schemes, for example a preemptive scheduling scheme, or a non-preemptive scheduling scheme, based on a timing to perform jobs, in addition to the priorities.

The synchronization scheduling apparatus 500 according to example embodiments may perform parallel processing using cores 0-n 511-516. The synchronization scheduling apparatus may arbitrate a wake-up operation of cores 0-n 511-516, and may control synchronization processing to be performed.

In another example, the synchronization scheduling apparatus according to example embodiments may start to search for a wait queue of the core k+1 515 next to the core k 514 that is already woken up in a previous cycle, and may then search for wait queues of each of the cores, searching for the wait queue of the core k 514 last, since it was already woken up in the previous cycle, to find a process to be woken up.

In one example, the synchronization scheduling apparatus may verify priorities of tasks assigned to each of the cores 0-n 511-516, in the order of core k+1 515 through core n 516, then core 0 511 through core k−1 513, which is next to core k 514 that is already woke up, then lastly core k 514.

In another example, it is possible the synchronization scheduling apparatus may verify priorities of tasks assigned to each of the cores 0-n 511-516, in a reverse order of core k−1 513 through core 0 511, then core n 516 through core k+1 515, which is next to core k 514 that is already woke up, then lastly core k 514.

As described above, when a synchronization scheduling apparatus in a real-time multi-core system according to example embodiments is used, it is possible to prevent starvation from occurring by processes having the same priority that are distributed to multiple cores and stalled during synchronization of the multiple cores. Thus, it is possible to prevent a performance of a predetermined core from being reduced since the predetermined core is unable to perform a job.

The synchronization scheduling method in the real-time multi-core system according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The synchronization scheduling method in the real-time multi-core system according to the above-described example embodiments may use one or more processors, which may include a microprocessor, central processing unit (CPU), digital signal processor (DSP), or application-specific integrated circuit (ASIC), as well as portions or combinations of these and other processing devices.

Although example embodiments have been shown and described, it would be appreciated by those skilled in the art that changes may be made in these example embodiments without departing from the principles and spirit of the disclosure, the scope of which is defined in the claims and their equivalents. For example, while some example embodiments describe a synchronization scheduling apparatus having four cores, it is envisioned that the synchronization scheduling apparatus could have more or less than four cores.

What is claimed is:

1. A synchronization scheduling apparatus in a real-time multi-core system, the synchronization scheduling apparatus comprising:
a plurality of cores, including a first core which receives a wake-up signal in a previous cycle, each of the plurality of cores having at least one wait queue; and
a scheduling processor to schedule tasks, the tasks being stored in the respective at least one wait queues,
wherein the scheduling processor schedules tasks stored in the at least one wait queues by analyzing contents of the at least one wait queues in a predetermined order, the predetermined order being determined based upon which core received the wake-up signal in the previous cycle,
wherein the contents of the at least one wait queue for the first core receiving the wake-up signal in the previous cycle are analyzed last.

2. The synchronization scheduling apparatus of claim 1, wherein the scheduling processor schedules the tasks based on priorities of the tasks.

3. The synchronization scheduling apparatus of claim 2, wherein the scheduling processor verifies the priorities of the tasks in an order from a wait queue of a second core through a wait queue of the first core.

4. The synchronization scheduling apparatus of claim 3, wherein, when a task stored in the wait queue of the first core has a same priority as a task stored in a wait queue of a other core, and when the same priority is verified to be the highest among the priorities of the tasks, the scheduling processor schedules the task stored in the wait queue of the other core.

5. The synchronization scheduling apparatus of claim 3, wherein the scheduling processor verifies the at least one wait queue in the order from the wait queue of the second core through the wait queue of the first core, and schedules a task first found among tasks having the same priority.

6. The synchronization scheduling apparatus of claim 1, further comprising:
a storage unit to store information regarding the plurality of cores, including information on the first core,
wherein the scheduling unit schedules tasks based on information received from the storage unit regarding the plurality of cores.

7. The synchronization scheduling apparatus of claim 6, wherein the scheduling processor updates, to the storage unit, information regarding a core corresponding to a currently scheduled task among the tasks stored in the respective at least one wait queues.

8. The synchronization scheduling apparatus of claim 2, wherein the scheduling processor verifies the priorities of the tasks of the plurality of cores, the priority of the first core being verified last.

9. The synchronization scheduling apparatus of claim 8, wherein, when a task stored in a wait queue of a core has the same priority as a other task stored in a other wait queue of a other core, the scheduling processor schedules the task which is first found among the tasks having the same priority.

10. A synchronization scheduling method in a real-time multi-core system, the synchronization scheduling method comprising:
maintaining a plurality of cores, including a first core which receives a wake-up signal in a previous cycle, each of the plurality of cores having at least one wait queue; and
scheduling tasks, the tasks being stored in the respective at least one wait queues,
wherein the scheduling comprises scheduling the tasks based on priorities of the tasks,
wherein the scheduling comprises analyzing contents of the at least one wait queues in a predetermined order, the predetermined order being determined based upon which core received the wake-up signal in the previous cycle,
and analyzing the contents of the at least one wait queue for the first core receiving the wake-up signal in the previous cycle last.

11. The synchronization scheduling method of claim 10, wherein the scheduling comprises:
verifying the priorities of the tasks in an order from a wait queue of a second core through a wait queue of the first core; and
when a task stored in the wait queue of the first core has a same priority as a task stored in a wait queue of a other core, and when the same priority is verified to be the highest among the priorities of the tasks, scheduling the task stored in the wait queue of the other core.

12. A non-transitory computer-readable recording medium storing a program to cause a computer to implement the method of claim 10.

13. The synchronization scheduling method of claim 10, further comprising:
storing information regarding the plurality of cores, including storing information regarding the first core,
wherein the scheduling uses information regarding the plurality of cores in scheduling tasks.

14. The synchronization scheduling method of claim 10, wherein the scheduling comprises:
verifying the priorities of the tasks, the priority of the first core being verified last; and
when a task stored in a wait queue of a core has the same priority as a other task stored in a other wait queue of a other core, the scheduling processor schedules the task which is first found among the tasks having the same priority.

15. A synchronization scheduling apparatus in a real-time multi-core system, the synchronization scheduling apparatus comprising:

a plurality of n cores, including a kth core which receives a wake-up signal in a previous cycle, each of the plurality of n cores having at least one wait queue; and a scheduling processor to schedule tasks and to verify priorities of the tasks, the tasks being stored in the respective at least one wait queues, wherein the scheduling processor schedules tasks stored in the at least one wait queues by analyzing contents of the at least one wait queues in a predetermined order, the predetermined order being determined based upon which core received the wake-up signal in the previous cycle, wherein the contents of the at least one wait queue for the kth core receiving the wake-up signal in the previous cycle are analyzed last, wherein k is an integer value equal to or greater than one, and n is an integer value equal to or greater than four.

16. The synchronization scheduling apparatus of claim 15, wherein the scheduling processor verifies the priority of stored tasks in an order from a (k+1)th core to the nth core when k is not equal to n, and then from the first core from among the n cores to the kth core.

17. The synchronization scheduling apparatus of claim 15, wherein the scheduling processor verifies the priority of stored tasks in an order from a (k−1)th core to the first core when k is not equal to one, and then from the nth core to the kth core.

* * * * *